(12) United States Patent
Togashi

(10) Patent No.: US 9,225,867 B2
(45) Date of Patent: Dec. 29, 2015

(54) IMAGE READING APPARATUS

(71) Applicant: CANON KABUSHIKI KAISHA, Tokyo (JP)

(72) Inventor: Kazunori Togashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/616,359

(22) Filed: Feb. 6, 2015

(65) Prior Publication Data

US 2015/0244891 A1 Aug. 27, 2015

(30) Foreign Application Priority Data

Feb. 26, 2014 (JP) ................................. 2014-035637

(51) Int. Cl.
*H04N 1/04* (2006.01)
*H04N 1/028* (2006.01)
*H04N 1/48* (2006.01)

(52) U.S. Cl.
CPC ........... *H04N 1/02885* (2013.01); *H04N 1/484* (2013.01); *H04N 2201/0081* (2013.01); *H04N 2201/03112* (2013.01)

(58) Field of Classification Search
CPC .......... H04N 2201/04789; H04N 2201/04765; H04N 2201/04791; H04N 1/00795; H04N 1/047; H04N 1/1215; H04N 1/195; H04N 1/19584; H04N 1/19589; H04N 1/40; H04N 2201/0434; G02B 15/173; G02B 27/646

USPC .......... 358/474, 461, 475, 505, 509; 359/684, 359/432, 557, 676, 766; 347/239, 255
See application file for complete search history.

(56) References Cited

U.S. PATENT DOCUMENTS

| | | | | |
|---|---|---|---|---|
| 5,602,853 | A * | 2/1997 | Ben-Michael et al. | 370/474 |
| 5,608,547 | A * | 3/1997 | Nakatani et al. | 358/505 |
| 6,289,134 | B1 * | 9/2001 | Kondo et al. | 382/274 |
| 6,545,777 | B1 * | 4/2003 | Amimoto | 358/509 |
| 7,782,503 | B2 | 8/2010 | Ishido et al. | 358/498 |
| 7,884,978 | B2 * | 2/2011 | Ikeno et al. | 358/509 |
| 8,502,853 | B2 * | 8/2013 | Curry et al. | 347/239 |
| 8,824,008 | B2 * | 9/2014 | Kubota et al. | 358/1.9 |
| 8,947,791 | B2 * | 2/2015 | Kogo et al. | 359/766 |
| 2012/0314291 | A1 * | 12/2012 | Kogo et al. | 359/557 |
| 2013/0050775 | A1 * | 2/2013 | Curry et al. | 358/474 |

* cited by examiner

*Primary Examiner* — Negussie Worku

(74) *Attorney, Agent, or Firm* — Fitzpatrick, Cella, Harper & Scinto

(57) ABSTRACT

The present disclosure is intended to make color misregistration amount in the sub scanning direction almost constant regardless of the turn-on period of each color when reading document using light sources which turn on in a plurality of colors. An image reading apparatus including a first illumination unit and a second illumination unit each having a plurality of light sources. Each illumination unit is configured to irradiate light from the light source to a document reading position. The plurality of light source include a first light source and a second light source, the first light source emits light in a first color and the second light source emits light in a second color which is different from the first color.

9 Claims, 10 Drawing Sheets

IMAGE READING APPARATUS

BACKGROUND OF THE INVENTION

1. Field of the Invention

The present disclosure relates to an image reading apparatus having light sources which lights in respective colors.

2. Description of the Related Art

A light emitting diode (hereinafter referred to as LED), which emits lights of red (R), green (G) and blue (B) colors, is used as a document illumination light source of an image reading apparatus of a copying machine and a multifunction printer. A document reading unit includes a contact image sensor (hereinafter referred to as CIS), which uses the LED as a light source.

In the CIS, which uses a three-color RGB LEDs as a light source, a color filter is not applied to a line sensor which receives diffused light from a document. When performing color reading of a document with the CIS, the R, G, and B LEDs are turned on in order and in synchronization with a line cycle, which is a reading cycle of the line sensor, to perform RGB color separation of document image.

On the other hand, when using the three-color RGB LEDs as a light source for document illumination, following problems occur. A first problem is that "color misregistration" occurs in a sub scanning direction of read image. To form a single line color image, each of the R, G, and B colors is read in order by one third lines. This causes the color misregistration in the sub scanning direction occurs. Each of the RGB color may be shifted at the document illumination position in the sub scanning direction, or at the image reading position, which causes the color misregistration. This theoretically produces, for example, the color misregistration of one third lines in the sub scanning direction.

A second problem is that there needs to adjust incident light quantity of diffused light from a document to the line sensor. Generally, the LED has large variation in emitted light quantity. Therefore, to avoid saturation of input and output levels to the line sensor, signal input range to an analog front end (hereinafter referred to as AFE), which is connected to a line sensor output post stage, needs to be set within an appropriate range. Generally, the signal input range is set by increasing or reducing LED turn-on period (turn-on time) to adjust the incident light quantity to the line sensor within an appropriate range. On the other hand, when adjusting the turn-on period in such a manner, LED turn-off period occurs within the line cycle of the line sensor. Therefore, if there is any fine line extending in the sub scanning direction of the document, sufficient illumination cannot be applied to the fine line. This result in a deterioration in reading accuracy of the fine line.

An image reading apparatus is disclosed in U.S. Pat. No. 6,545,777, which is a proposal to the first problem as mentioned above. The image reading apparatus decreases color misregistration amount in the sub scanning direction by controlling LED turn-on timing of each of the R, G, and B LEDs which turns on within a line cycle of a line sensor. Specifically, to optimize an output level of the line sensor, the image reading apparatus adjusts the LED turn-on period. Thereafter, assuming that the R and B LEDs are respectively turned on before and after the G LED is turned on, for example, the LED turn-on periods of the R and B LEDs are respectively controlled with respect to the LED turn-on period of the G LED. The LED turn-on periods of the R and B LEDs are adjusted in a time-series manner such that the respective LED turn-on periods of the R and B LEDs will conform to the cycle of the turn-on period of G LED (U.S. Pat. No. 6,545,777, FIG. 9). It is noted that the line cycle of the line sensor and the turn-on timings of the each of the R, G, and B LEDs within the cycle affect the color misregistration amount in the sub scanning direction. Therefore, the above adjustment is employed. Through the above adjustment, the turn-on period of R LED gets closer to that of G LED. Similarly, through the control, the turn-on period of G LED gets closer to that of B LED. As a result, when the document is irradiated with the light, the position misregistration among the RGB colors is reduced, thus the color misregistration is reduced.

An image reading apparatus disclosed in U.S. Pat. No. 7,884,978 attempts to provide a proposal to the second problem as mentioned above. The image reading apparatus comprises LED turn-on control circuit, by which turn-on timing of each of the R, G, and B LEDs can individually be changed with CIS having two LEDs of the illumination light source. In the image reading apparatus, in one LED turn-on timing adjustment, a turn-on start position is fixed near a line cycle start position of a line sensor. By changing a turn-on end position, the turn-on period is adjusted. In the other LED turn-on timing adjustment, the turn-on end position is fixed near a line cycle end position of the line sensor. By changing the turn-on start position, the turn-on period is adjusted. This reduces a period during which the LED is turned-off within the line cycle.

According to the description of U.S. Pat. No. 6,545,777, color misregistration amounts in the sub scanning direction can be reduced. On the other hand, an image processing affected by the color misregistration includes, for example, processing of determining whether character on a read document is black character or not. Also, the image processing includes processing of automatically determining whether a read document is color document or monochrome document. In this case, deterioration of determination accuracy cannot be prevented only by the reduction of the color misregistration, which is a problem.

Also, to perform determination processing as mentioned, it is necessary to perform color misregistration correction processing to solve the color misregistration to generate an image in which color misregistration is almost solved. However, there is an individual variability in the incident light quantity of LED. Therefore, when the LED turn-on time is adjusted for every LED or every image reading apparatus, the turn-on period of each of the R, G, and B LEDs differs depending on the apparatus. U.S. Pat. No. 6,545,777, FIG. 9 illustrates LED turn-on period of each of the R, G, and B LEDs. If a period from turn-on end of R LED to turn-on start of G LED and a period from turn-on end of G LED to turn-on start of B LED differ in each apparatus, the color misregistration amount produced on an image in the sub scanning direction accordingly differs in each apparatus. Therefore, the color misregistration amount in the sub scanning direction differs in each apparatus depending on the apparatus.

According to the description of U.S. Pat. No. 7,884,978, the LED turn-off period within the line cycle of the line sensor can be reduced. However, when the LED turn-on time is adjusted for every image reading apparatus, the turn-on period of each of the R, G, and B LEDs differs depending on the apparatus. A center position of the turn-on period of each of the R, G, and B LEDs within the line cycle also changes for every apparatus. Similar to the image reading apparatus as disclosed in U.S. Pat. No. 6,545,777, the period from turn-on end of R LED to turn-on start of G LED differs from the period from turn-on end of G LED to turn-on start of B LED at a center of the LED turn-on period. Therefore, the color misregistration amount produced on the image in the sub scanning direction differs accordingly. As a result, the color misregistration amount in the sub scanning direction differs depending on the apparatus.

Accordingly, to perform the color misregistration correction processing when LED turn-on control, described in U.S. Pat. No. 6,545,777 and U.S. Pat. No. 7,884,978, is performed, it is necessary to measure the color misregistration amount for every apparatus and perform the color correction processing based on the measured result (for example, parameter setting). As a result, the increased number of steps, including measuring the color misregistration amount in a production process, incurs cost increase of product.

SUMMARY OF THE INVENTION

According to an aspect of the present disclosure, an image reading apparatus comprises a first illumination unit and a second illumination unit each having a plurality of light sources, each illumination unit configured to irradiate light from the light source to a document reading position, the plurality of light source include a first light source and a second light source, the first light source emits light in a first color and the second light source emits light in a second color which is different from the first color. Further, the image reading apparatus comprises a light receiving unit configured to receive reflection light from a document to which light is irradiated by the first illumination unit and the second illumination unit, and to output, in response to a line synchronization signal, a first image signal in accordance with received light quantity; and a control unit configured to independently control 1) a turn-on period of each of the plurality of light sources in the first illumination unit and 2) a turn-on period of each of the plurality of light sources in the second illumination unit, in response to the line synchronization signal, wherein: control unit is further configured to control, when reading the document, to turn on the light source of a same color by the first illumination unit and the second illumination unit within a line cycle defined in response to the line synchronization signal, and; the control unit is further configured to control the first illumination unit and the second illumination unit such that a center position of the turn-on period of each of the plurality of the light sources in the first illumination unit coincides with a center position of the turn-on period of each of the plurality of the light sources in the second illumination unit, within the line cycle defined in response to the line synchronization signal.

Further features of the present invention will become apparent from the following description of exemplary embodiments (with reference to the attached drawings).

DESCRIPTION OF THE EMBODIMENTS

Now, embodiments of the present disclosure are described. In the following, example is given in a case where the present disclosure is applied to the image reading apparatus and embodiments are described with reference to the accompanying drawings.

First Embodiment

Figure 1:
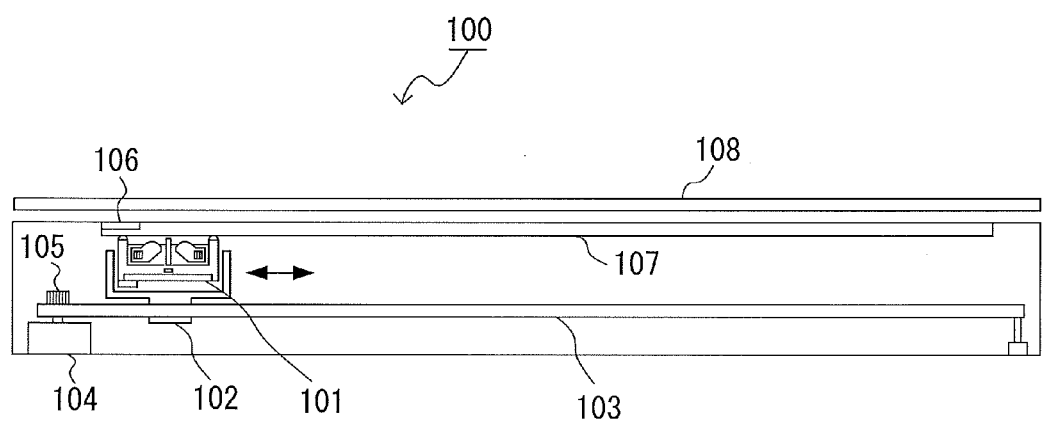
FIG. 1 is a schematic longitudinal sectional view of an image reading apparatus according to a first embodiment.

FIG. 1 is a schematic longitudinal sectional view of an image reading apparatus according to the present embodiment. The image reading apparatus 100 shown in FIG. 1 includes a contact image sensor (CIS) 101, a CIS holder 102, a timing belt 103, a motor 104, a driving gear 105, a white reference plate 106, a document table glass 107, and a document table glass cover 108.

The CIS 101 is a contact image sensor which is an image reading unit. The CIS holder 102 holds the CIS 101. The timing belt 103 is connected to the CIS holder 102. The motor 104 drives the timing belt 103 via the driving gear 105. This allows to reciprocatingly operate the CIS 101 in an arrow direction shown in FIG. 1. The white reference plate (reference member) 106 is a reference plate which is read when generating shading correction coefficient for shading correction. In particular, by irradiating light to the white reference plate 106 and receiving, by a line sensor 204, the reflection light (described later), reading is performed. The white reference plate 106 is also used as a concentration reference when obtaining output level (luminance value) of the CIS 101 when adjusting a LED turn-on period (a period during which LED is turned on) (described later). A document placed on the document table glass 107 is read when the CIS 101 moves from a head to an end of the document through the above-mentioned driving feature. The CIS 101 also moves to a position for reading the white reference plate 106 when generating shading correction coefficient or adjusting LED turn-on period.

Figure 2A:
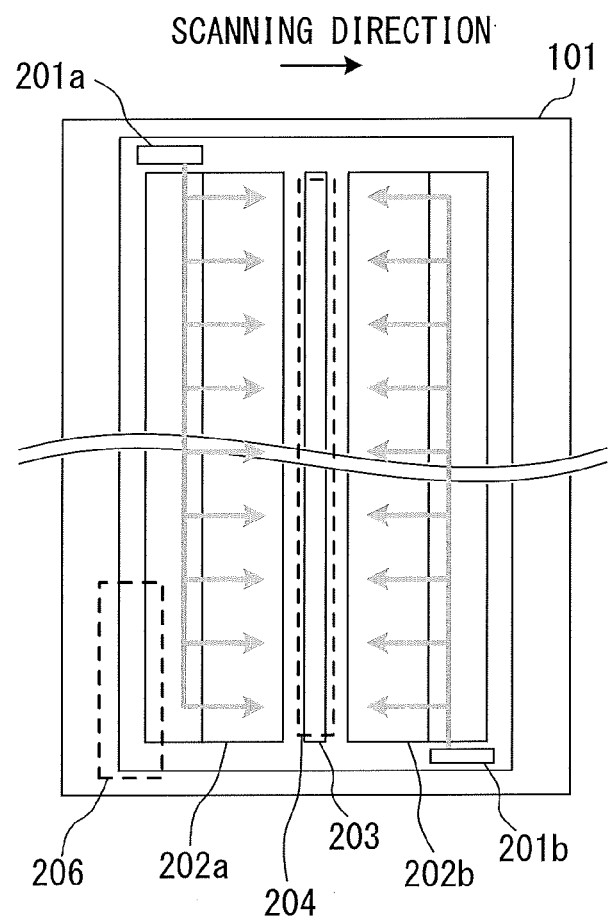
FIGS. 2A and 2B are diagrams illustrating configuration examples of CIS in the image reading apparatus.
Figure 2B:
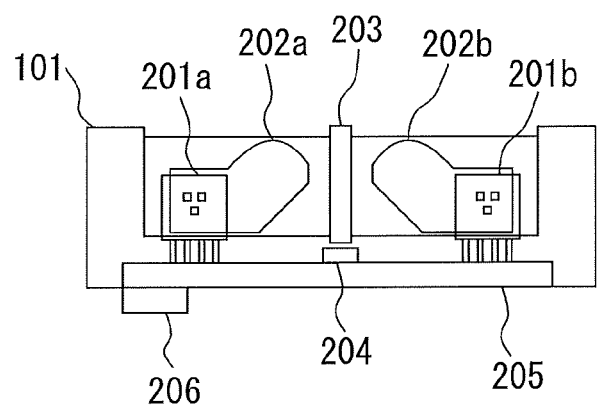

FIG. 2 is a diagram for explaining a configuration example of the CIS 101. FIG. 2A is a schematic plane view of the CIS 101 and FIG. 2B is a schematic longitudinal sectional view of the CIS 101. The CIS 101 shown in FIG. 2 is formed of LED units 201a and 201b, light guides 202a and 202b, a lens array 203, a line sensor 204, a printed board 205, and a connector 206. The LED units 201a and 201b are the light sources, formed of three LEDs, which emit lights in red (R), green (G) and blue (B). As shown in FIG. 2A, the LED unit 201a is disposed at one end of the light guide 202a. Also, as shown in FIG. 2A, the LED unit 201b is disposed at one end of the light guide 202b.

Light emitted by the LED unit 201a diffuses to the other end of the light guide 202a through an inside of the light guide 202a. The light is then emitted from where has curvature of the surface of the light guide 202a. Similarly, light emitted by the LED unit 201b is diffused to the other end of the light guide 202b through an inside of the light guide 202b. The light is then emitted from where has curvature of the surface of the light guide 202b. Through the irradiation from both the LED unit 201a and the LED unit 201b, a whole area in the sub scanning direction of the document is illuminated.

In FIG. 2A, arrows, extending from the LED units 201a and 201b in the direction of the lens array 203, are shown. This schematically illustrates routes of the lights, from emission by the LED units 201a and 201b to irradiation to the document. The light emitted from the light guides 202a and 202b are irradiated to the document. The light diffused on the document is imaged on the line sensor 204 through the lens array 203. As mentioned, the LED unit 201 and the light guide 202 work as an illumination unit to irradiate light to the document. In particular, the LED unit 201a and the light guide 202b serve as a first illumination unit to irradiate light to the document. Further, the LED unit 201b and the light guide 202b serve as a second illumination unit to irradiate light to the document. The lens array 203 and the line sensor 204 serve as a light receiving unit to receive diffused light from the document and output image signal in accordance with to the received light quantity.

In the CIS 101, included in the image reading apparatus 100 of the present embodiment, color filter is not applied on the line sensor 204. Therefore, when the document is color-scanned, RGB color separation is performed by light sources of the LED units 201a and 201b. In particular, when color image is scanned, the LED units 201a and 201b turn on each of the R, G, and B LEDs in order for every line cycle which is the reading cycle of the line sensor 204. It means that, the LED units 201a and 201b turn on a color in order corresponding to each line cycle within three continuous line cycles. Then, the line sensor 204 receives the diffused light from the document for every R, G, and B color.

The line sensor 204 and the LED unit 201 are mounted on the printed board 205 with other circuit components. The connector 206 connects signal line with a control board (not shown) for sending/receiving of current to turn on the LED units 201a and 201b, control signals to operate the line sensor 204, video signals output by the line sensor 204, and electrical signals such as power supply voltage etc. Note that, flexible flat cable (FFC) is often used as the signal line connected to the connector 206.

Figure 3:
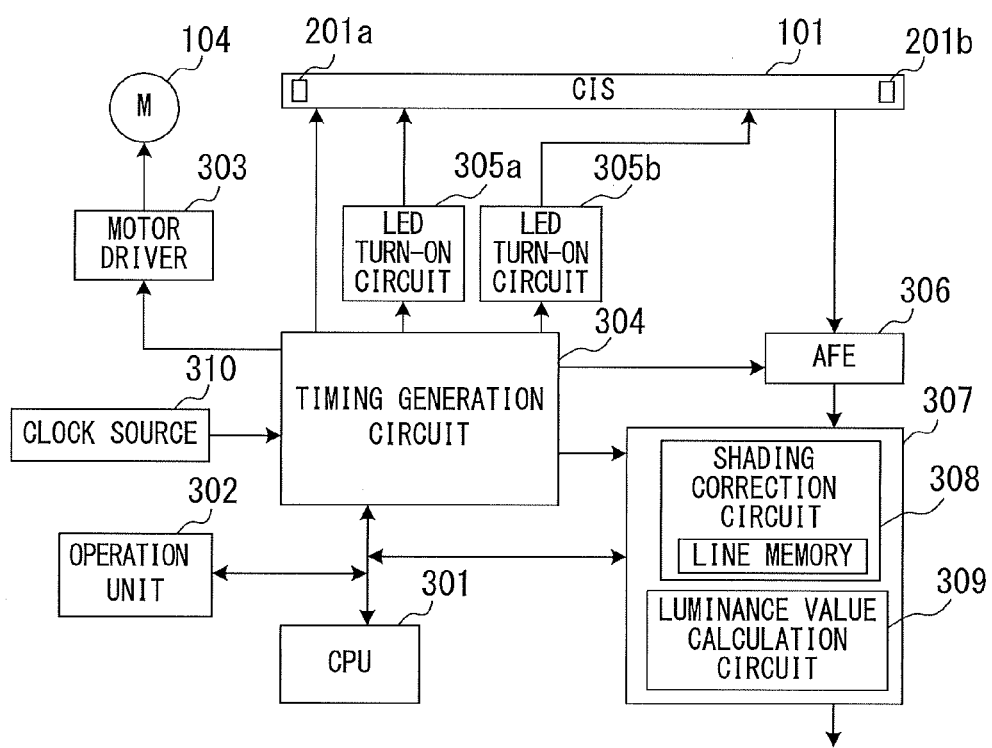
FIG. 3 is a block diagram illustrating an example of a control system of the image reading apparatus.

FIG. 3 is a block diagram illustrating an example of a control system of the image reading apparatus 100. A central processing unit (CPU) 301 shown in FIG. 3 performs entire control of the image reading apparatus 100. Also, the CPU 301 performs computation when LED turn-on start timing and the LED turn-on end timing are changed (described later). An operation unit 302 receives operation to set copy mode, such as color copy and monochromatic copy, from a user.

A timing generation circuit 304 is a circuit for generating timing signal required to operate a motor driver 303 (described later), the CIS 101, a LED turn-on circuit 305, an AFE 306, and an image processing circuit 307. The timing generation circuit 304 operates based on a clock signal outputted from a clock source 310. The timing generation circuit 304 also generates various timing signals based on an instruction from the CPU 301.

The motor driver 303 is a circuit for driving the motor 104, through which excitation current in accordance with the signal from the timing generation circuit 304 is outputted to the motor 104. In response to the line synchronization signal and the clock signal outputted by the timing generation circuit 304, the CIS 101 outputs image signal in accordance with the received light quantity. The line cycle of the line sensor 204 is defined by the line synchronization signal.

The LED turn-on circuits 305a and 305b form constant current circuits to turn on the LED. The turn-on circuit 305a corresponds to the LED unit 201a and the turn-on circuit 305b corresponds to the LED unit 201b. Three constant current circuits are arranged in the LED turn-on circuits 305a and 305b, each of which is connected to each of the R, G, and B LEDs of the LED units 201a and 201b. The details of the LED turn-on circuits 305a and 305b will be described later. The timing generation circuit 304 outputs LED turn-on control signal. In response to the signal, every LED turn-on circuit 305 supplies current to the LED to turn on the LED. The LED turn-on control signal is a signal outputted in synchronization with the line synchronization signal supplied to the CIS 101. Also, through the setting of the CPU 301, the LED turn-on signal defines the LED turn-on start timing or turn-on end timing within the line cycle. These timings can be changed respectively. As mentioned, the CPU 301, the timing generation circuit 304 and the LED turn-on circuit 305 serve as a control unit, through which turn-on start or turn-on end is independently controlled for every light source color. It means that, in response to the line synchronization signal, the turn-on start or the turn-on end is made independently controllable. The CPU 301, the timing generation circuit 304 and the LED turn-on circuit 305 also serve as an adjustment unit. Through the adjustment unit, the turn-on period of each of the plurality of colors, which is turned on by the first illumination unit, is adjusted. Similarly, through the adjustment unit, the turn-on period of each of the plurality of colors, which is turned on by the second illumination unit, is adjusted. Details will be described later.

The AFE (analog front end) 306 is a circuit (IC) for performing analog processing to an analog image signal outputted from the CIS 101. The processing includes sample hold processing, offset processing and gain processing. The AFE 306 also performs AD conversion for converting the analog-processed image signal into digital data. The CPU 301 also performs parameter setting etc. of the analog processing, such as offset set value and gain set value to the AFE 306 through the timing generation circuit 304. Further, the CPU 301 generates timing signals for a sample hold circuit or for AD conversion, and outputs the timing signal.

The image processing circuit 307 performs a predetermined image processing. Based on the digital image data received from the AFE 306, a shading correction circuit 308 generates shading correction coefficient and performs shading correction processing. To generate the shading correction coefficient, the shading correction circuit 308 comprises a line memory in which image data of one line obtained by reading the white reference board 106 is stored. When reading color image, the shading correction is individually performed for every R, G, and B color. Therefore, three shading correction circuits and three line memories for R, G, and B colors are prepared.

A luminance value calculation circuit 309 is a circuit for calculating luminance value of the image data with reference to the content of the image data stored in the line memory. The luminance value calculation circuit 309 outputs results (output value) including an average value of all line memory data, an average value and maximum value in a range of a predetermined sub scanning direction. These are values acceptable for the line sensor 204 when the LED unit 201 is emitted. The image data outputted from the image processing circuit 307 is sent to a post stage image processing unit (not shown) for outputting copy.

Figure 4:
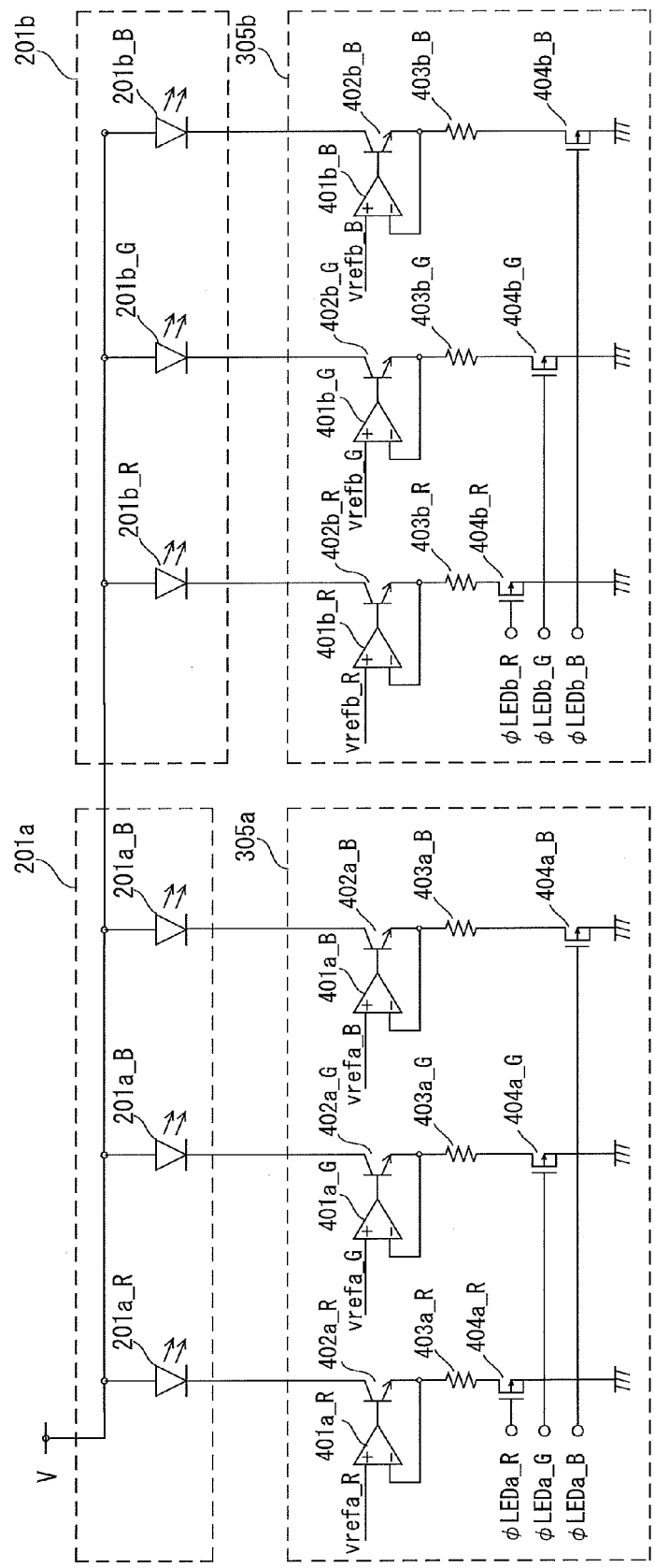
FIG. 4 is a schematic circuit diagram illustrating configuration example of LED turn-on circuit.

FIG. 4 is a schematic circuit diagram illustrating a configuration example of LED turn-on circuits 305a and 305b. As shown in FIG. 4, the LED turn-on circuits 305a and 305b respectively include three constant current circuits. The LED turn-on circuit 305a is connected to the LED unit 201a. The LED turn-on circuit 305b is connected to the LED unit 201b. A single constant current circuit is connected to a single LED element. The constant current circuit includes an operational amplifier 401, a transistor 402, and a current detection resistor 403. A predetermined voltage level is applied to "+" terminal of the operational amplifier. A voltage applied to an emitter terminal of the transistor is fed back to "−" terminal of the operational amplifier, thereby a current of a predetermined value flows to the LED.

Each constant current circuit has switch 404 (switches 404a_R, G, B and switches 404b_R, G, B). The switch is to control ON/OFF of current supply to each LED. The switch 404 is controlled by the LED turn-on control signal which is outputted by the timing generation circuit 304. The LED turn-on control signal which is outputted by the timing generation circuit 304, connected to each switch, is defined as φLEDa_R, φLEDa_G, φLEDa_B, φLEDb_R, φLEDb_G and φLEDb_B. For example, when the level of φLEDa_R signal is H level, the switch 404a_R turns ON state. Through a power V, current is flown to the LED unit 201a_R. Then, the LED unit 201a_R is turned on. When the level of φLEDa_R signal is L level, the switch 404a_R turns OFF state. Current is not flown to the LED unit 201a_R. Then, the LED unit 201a_R is turned off. The timing generation circuit 304 is capable of changing timing to switch between the H level and the L level of the LED turn-on control signal for every switch 404, so that the turn-on timing of the LED units 201a and 201b can individually be controlled.

Figure 5:
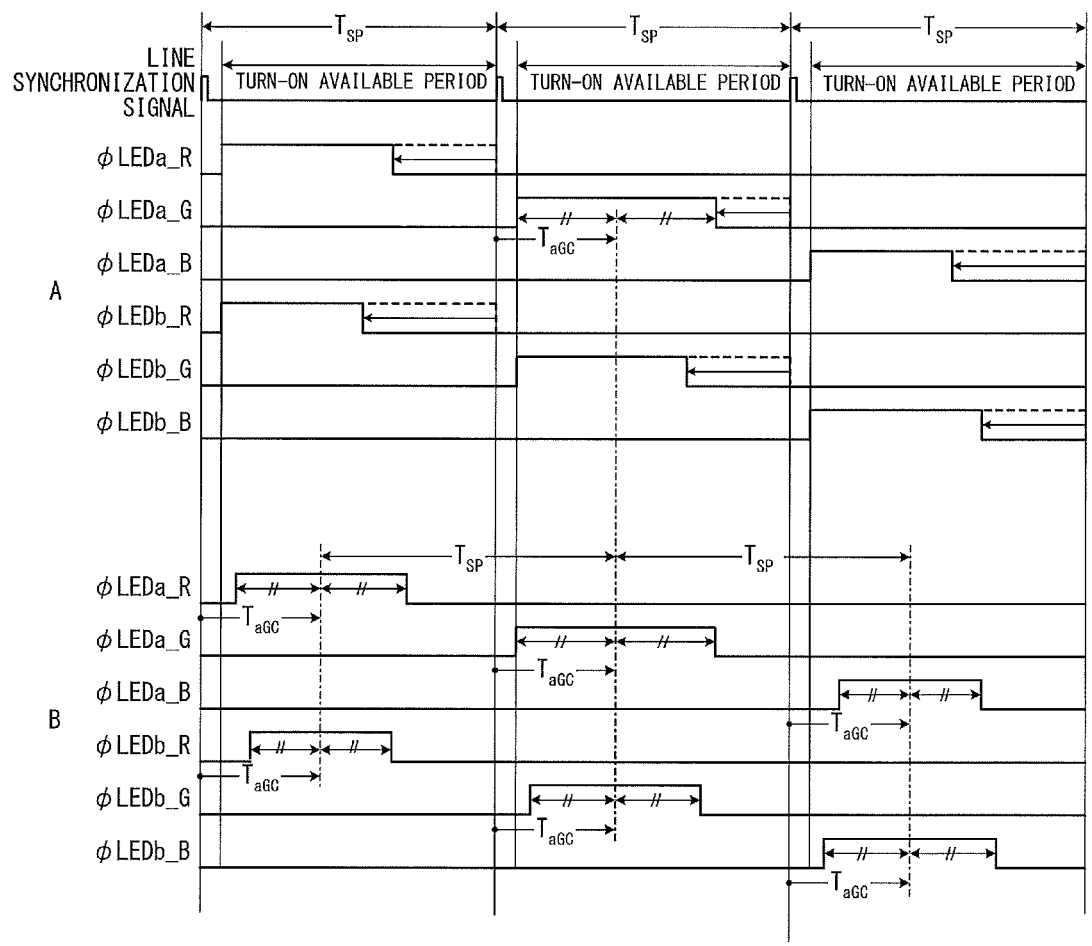
FIG. 5 is a timing chart of line synchronization signal and LED turn-on control signal.

FIG. 5 is a timing chart of the line synchronization signal and the LED turn-on control signal. In particular, FIG. 5 illustrates the timing chart of the line synchronization signal and the LED turn-on control signal, the line synchronization signal supplied to the CIS 101 by the timing generation circuit 304 and the LED turn-on control signal supplied to the LED turn-on circuits 305a and 305b by the timing generation circuit 304.

As shown in FIG. 5, the line synchronization signal is transmitted in $T_{SP}$ cycle, meaning that the line cycle is TSP. A period during which LED is capable of turning on (turn-on available period) is set within the line cycle $T_{SP}$. FIG. 5 shows the turn-on available period within the line cycle $T_{SP}$. In the turn-on available period, a line synchronization signal is transmitted till the next line synchronization signal is transmitted except for a predetermined period after the line synchronization signal is transmitted. It is noted that, in the predetermined period, some signal processing etc., using sensor light receiving signal received when the LED is turned off, is performed. Therefore, in the predetermined period, it is prohibited to turn on the light source defined by a line sensor specification.

An area A in the timing chart shown in FIG. 5 shows LED turn-on control signals. Through the signals, the turn-on period of each of the plurality of colors in the LED units 201a and 201b are adjusted. FIG. 5 shows six LED turn-on control signals. The six turn-on control signals correspond to the names of the respective turn-on control signals shown in FIG. 4. A broken line of each LED turn-on signal shows start of LED adjustment mode. A solid line of each LED turn-on signal shows when the turn-on of the LED is being adjusted. When the LED adjustment mode is executed, the LED is turned on during whole turn-on available period. Then, after the adjustment is started, a turn-on end position is changed by a predetermined amount to reduce the turn-on period. Then, every time the turn-on end position is changed, luminance value of the white reference board 106 is obtained. The change of the turn-on end position is continued till the obtained luminance value reaches a predetermined value. Since there is an individual variability in the incident light quantity of LED, the turn-on period is adjusted in order to obtain a predetermined value upon turning on each LED. As a result, the turn-on period defined by the turn-on start timing and the turn-on end timing differs from each LED. Note that, in the LED adjustment mode, the incident light quantity of a single LED needs to be measured. To that end, the LED units 201a and 201b will not be turned on at the same time. They are controlled such that one of the LED units is turned on first and the other LED is turned on thereafter.

An area B in the timing chart shown in FIG. 5 shows timing of the LED turn-on control signals after the turn-on period is adjusted. As shown in FIG. 5, in contrast with the timing before the adjustment shown in the area A, the turn-on start position and the turn-on end position of the turn-on control signal are changed except for the φLEDa_G signal. In particular, a center position of the φLEDa_G signal, having the longest turn-on period, is set as a reference position. The turn-on start position and the turn-on end position are changed such that center positions of the other LED turn-on control signals coincide with the reference position. For example, a period defined by a line cycle start position to a center position of the turn-on period of the LEDa_G signal is defined as TaGC. At this time, when setting the center position of the LEDa_G signal as the reference position and changing the turn-on start position and the turn-on end position of the other LEDs in above-mentioned manner, time defined by the start of the line cycle to the center position of the turn-on period of all LED turn-on signals will be TaGC. As a result, a center position cycle of turn-on period of each of the R, G, and B LEDs will coincides with the line cycle $T_{SP}$. A processing procedure of the LED adjustment mode will be described with reference to FIG. 6.

Figure 6:
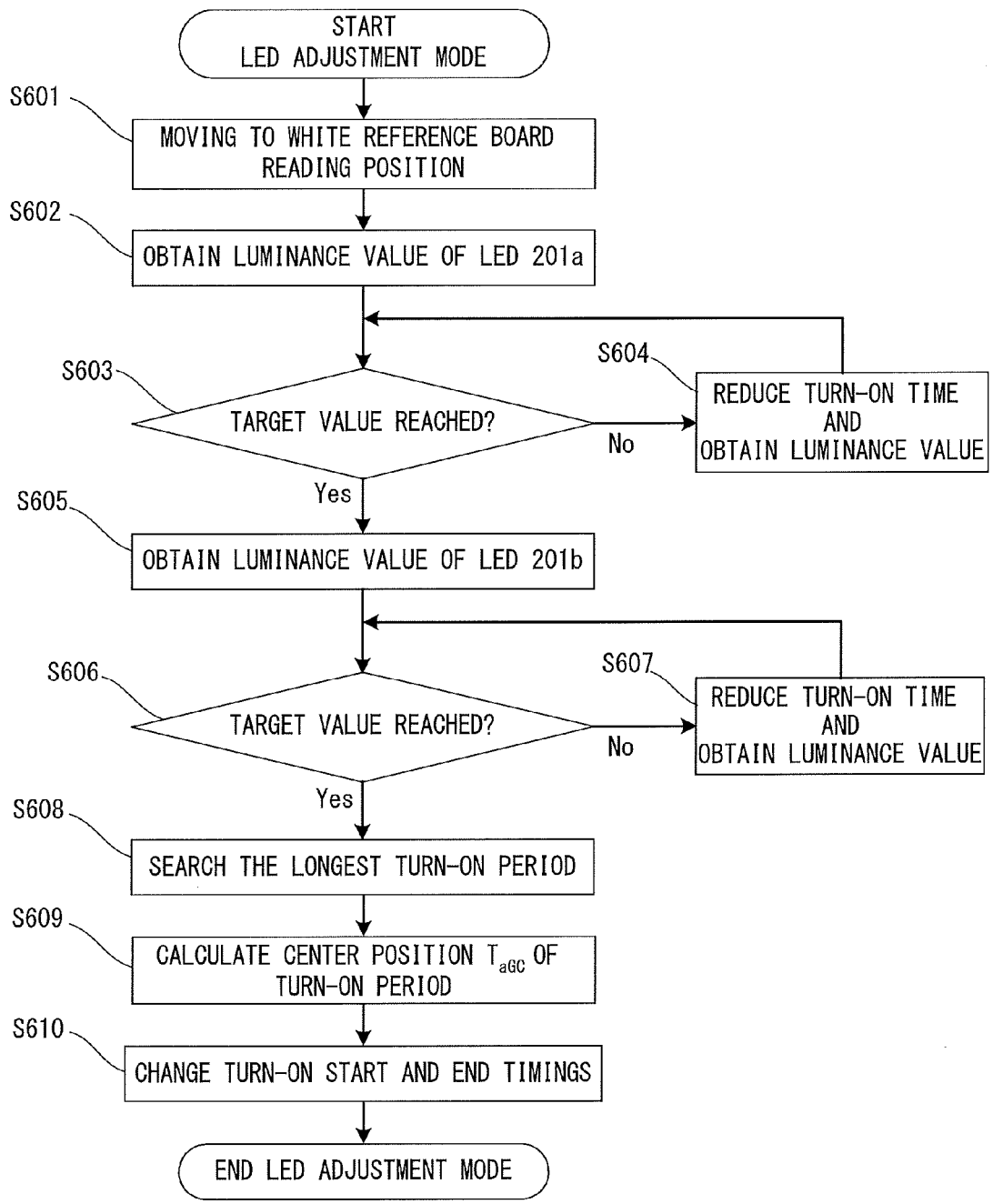
FIG. 6 is a flowchart illustrating an example of processing procedure in LED adjustment mode.

FIG. 6 is a flowchart illustrating examples of processing procedure of the image reading apparatus 100 in LED adjustment mode. In response to an instruction to execute the LED adjustment mode, the CPU 301 executes each processing in the LED adjustment mode.

The CPU 301 moves the CIS 101 to a reading position of the white reference board 106 (S601). The CPU 301 turns on the LED unit 201a and obtains the luminance value when the white reference board 106 is read (S602). In particular, the CPU 301 turns on the LED unit 201a at the timing of the LED turn-on control signal indicated by the broken line in the area A shown in the timing chart shown in FIG. 5. The CPU stores image data of one line received when illuminating the white reference board in the above-mentioned manner in the line memory of the shading correction circuit 308. Then, the CPU 301 obtains the luminance value of each of the R, G, and B colors through the luminance value calculation circuit 309. Note that the shading correction processing in the shading correction circuit 308 is set invalid.

The CPU 301 determines whether the luminance value obtained in the processing of Step S602 reaches a target value (S603) or not. In particular, it is determined whether the luminance value of each of the R, G, and B colors of the LED unit 201a obtained in the processing of Step S602 reaches a target value or not. For example, when the target value is 120 in 256 gradations, it is determined whether the luminance value of each of the R, G, and B colors turns 120 or less or not. That is, the turn-on time of the color having reached the target value is determined. If it is determined that the luminance value of all R, G, and B colors reaches the target value (S603: Yes), the processing moves to the processing of Step S605. If not (S603: No), meaning that if one of the luminance values fails to reach the target value, the processing moves to the processing of Step S604.

The CPU 301 obtains the luminance value again by reducing the LED turn-on time (S604). Here, turn-on time is reduced for the color as determined to have failed to reach the target value in the processing of Step S603. The turn-on time is not changed for the color having reached the target value. The CPU 301 determines again whether the luminance value obtained again by reducing the LED turn-on time of the target color reaches the target value or not. As mentioned, the steps S603 and S604 are repeated until the luminance value of each of the plurality of colors reaches the target value.

Each processing of Steps S605, S606 and S607, performed to the LED unit 201b, respectively corresponds to the steps S602, S603 and S604. The CPU 301 turns on the LED unit 201b and obtains the luminance value when the white reference board 106 is read (S605). The CPU 301 determines whether the luminance value obtained in the processing of Step S605 reaches a target value (S606) or not. If it is determined that the luminance value of all R, G, and B colors reaches the target value (S606: Yes), the processing moves to the processing of Step S608. If not (S606: No), meaning that if one of the luminance values fails to reach the target value, the CPU 301 obtains the luminance value again by reducing the LED turn-on time (S607). Note that the LED turn-on timing at the time of ending the processing of the Step S606 corresponds to the timing shown by the solid line in the area A shown in the timing chart in FIG. 5.

The CPU 301 identifies (searches) a signal having the longest turn-on period among the six LED turn-on control signals (S608). For example, in the area A shown in the timing chart in FIG. 5, the φLEDa_G signal has the longest LED turn-on period so that the turn-on period thereof is selected.

The CPU 301 calculates the center position of the LED turn-on period of the LED turn-on control signal selected in the processing of Step S608 (S609). The center position $T_{aGC}$ of the turn-on period within the line cycle can be obtained by the expression (1).

Center position of turn-on period=turn on start position+(turn-on end position-turn-on start position)/2  (1)

For example, if φLEDa_G signal is selected in the processing of Step S608, the center position $T_{aGC}$ of the turn-on period of the φLEDa_G signal is obtained by the expression (1).

The CPU 301 sets the center position $T_{aGC}$ as obtained in the processing of Step S609 as a reference position and changes the turn-on start timing and the turn-on end timing of each LED turn-on control signal (S610). Through this, the turn-on start position and turn-on end position of the LED turn-on control signal, except for the φLEDa_G signal selected in the processing of Step S608, are changed. Thereby the center position of the turn-on period coincides with the center position $T_{aGC}$. The turn-on start position and the turn-on end position can be obtained by the expressions (2) and (3).

Turn-on start position=(1)−(turn-on end position-turn-on start position)/2  (2)

Turn-on end position=(1)+(turn-on end position-turn-on start position)/2  (3)

Setting the result obtained by the above calculation to the timing generation circuit 304, a timing to output the LED turn-on control signal is obtained. This is the timing shown in the area B shown in the timing chart in FIG. 5. As mentioned, based on the turn-on time of each of the plurality of colors in the LED unit 201a and the turn-on time of each of the plurality of colors in the LED unit 201b, the turn-on periods of each of the plurality of colors in the LED units 201a and 201b are adjusted.

The LED adjustment mode may be performed before generating the shading correction coefficient. Further, if LED of little deterioration with time is used, the LED adjustment mode may only be performed in the production process of the apparatus. In that case, information indicating the turn-on start position and the turn-on end position as obtained are stored in the non-volatile ROM (not shown). Then, when starting the reading job, the turn-on start position and the turn-on end position may be read from the non-volatile ROM. The read positions may be set in the timing generation circuit 304 to turn on the LED.

As mentioned, the image reading apparatus 100 of the present embodiment sets the center position $T_{aGC}$ of the LED turn-on control signal having the longest turn-on period as a reference position. Then, turn-on start and turn-on end are controlled such that the center position of the turn-on period of the other LED turn-on control signals coincides with the reference position. In the image reading apparatus 100, in which the LED turn-on period is adjusted for document illumination, a constant color misregistration amount in the sub scanning direction of the read image of a document is obtained, regardless of the turn-on period of the LED turn-on control signal. Also, in the image reading apparatus 100, the center position cycle of the turn-on period of the LED turn-on control signal coincides with the line cycle. Therefore, the color misregistration amount is reduced to almost one-third of the amount in the prior art, which eliminates the need to measure the color misregistration amount in the sub scanning direction for every image reading apparatus to correct the color misregistration in the sub scanning direction. Further, with one third color misregistration correction amount as previously determined, sufficient removal of the color misregistration becomes possible.

Second Embodiment

Figure 7:
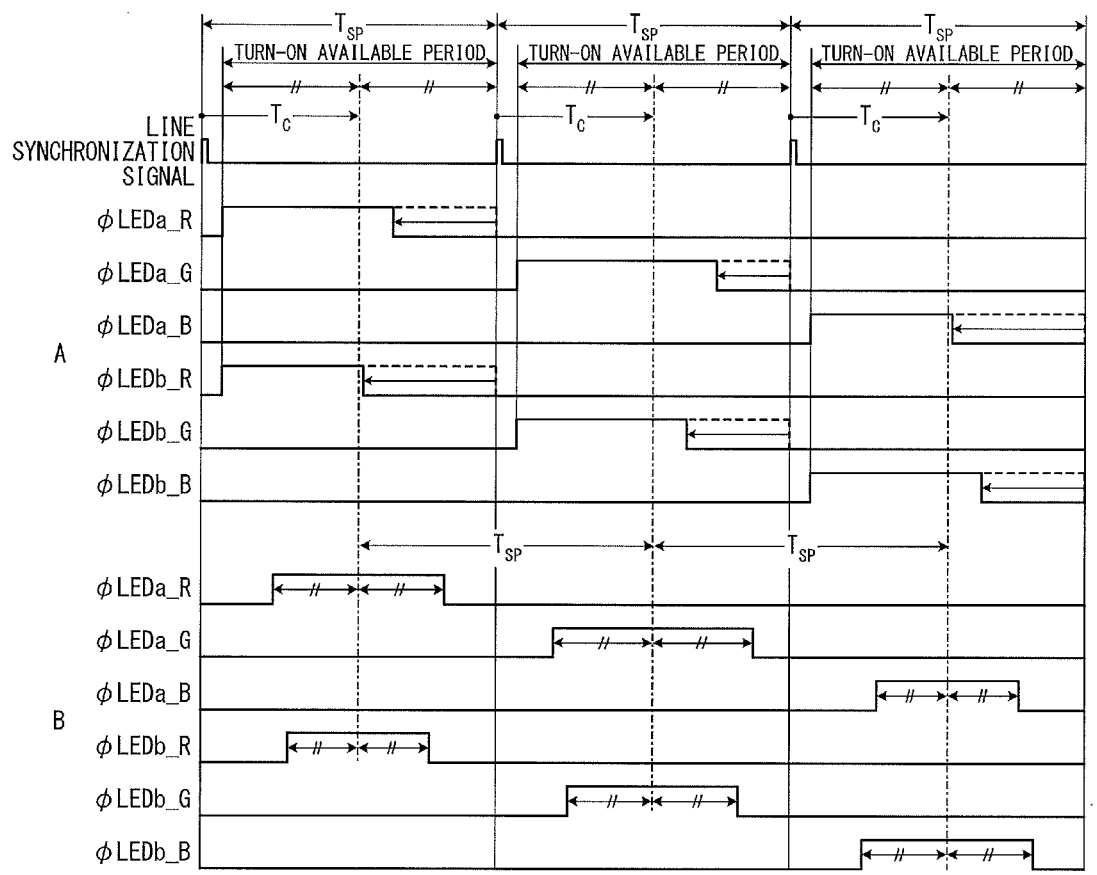
FIG. 7 is a timing chart of line synchronization signal and LED turn-on control signal in the image reading apparatus according to a second embodiment.
Figure 8:
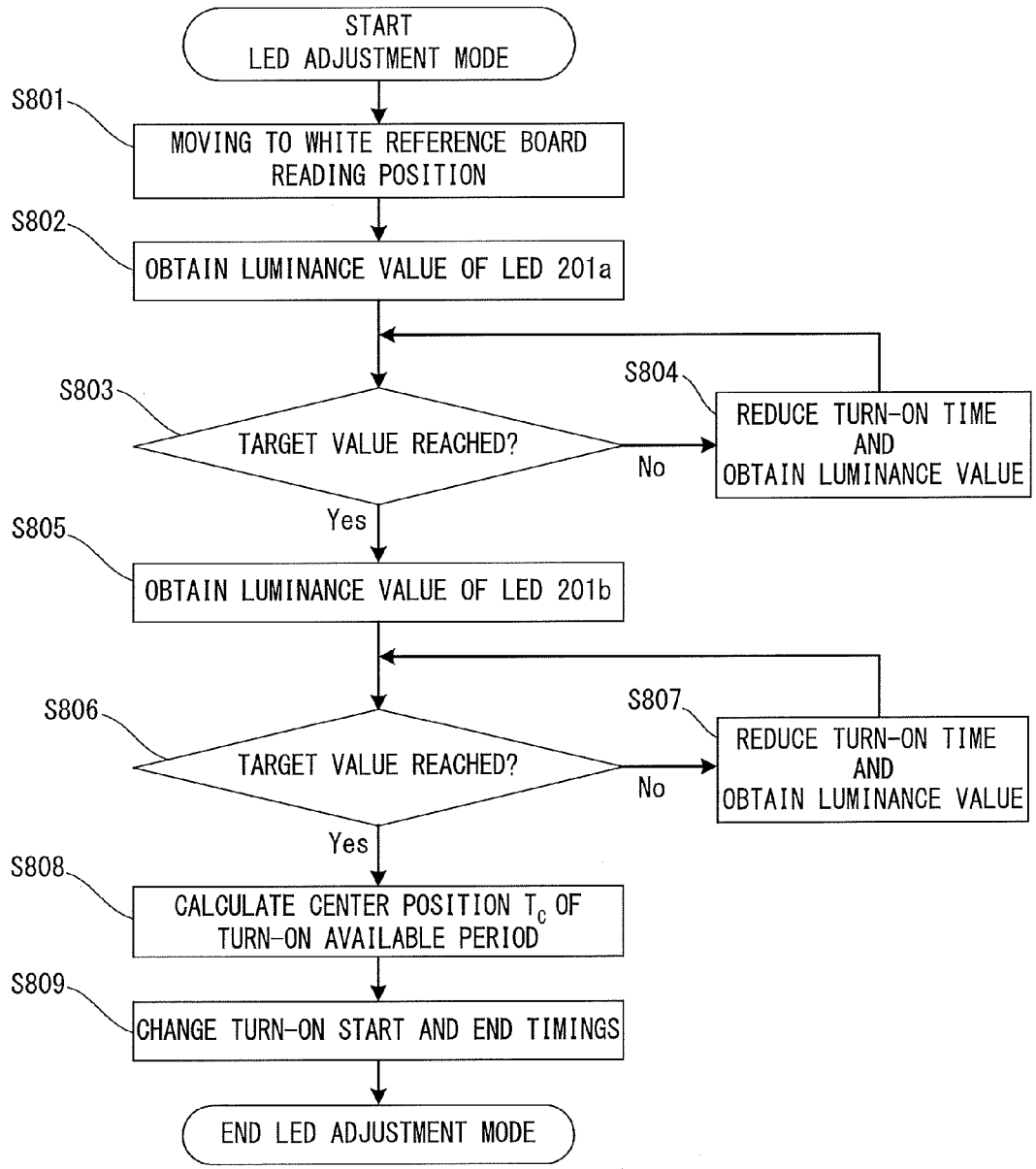
FIG. 8 is a flowchart illustrating an example of processing procedure in LED adjustment mode.

In the present embodiment, with the use of FIGS. 7 and 8, an image reading apparatus for performing processing which differs from the first embodiment in the LED adjustment mode is described. In particular, in the image reading apparatus of the present embodiment, the center position of the LED turn-on available time is set as a reference position. Then, the turn-on start position and the turn-on end position of each LED turn-on control signal are changed. Note that same symbols are used for the components which are identical to those as described in the first embodiment and the description thereof will be omitted.

FIG. 7 is a timing chart of the line synchronization signal and the LED turn-on control signal of the image reading apparatus according to the present embodiment. Note that an area A in the timing chart shown in FIG. 7 is the same as the area A shown in FIG. 5. Further, an area B in the timing chart shown in FIG. 7 shows timing in which the center position of the turn-on available time is set as a reference position and the turn-on start position and the turn-on end position of each LED turn-on control signal are changed. That is, similar to the first embodiment, the center position of the turn-on period of each LED turn-on control signal coincides with the line cycle $T_{SP}$.

FIG. 8 is a flowchart illustrating examples of processing procedure of the image reading apparatus in LED adjustment mode. In particular, FIG. 8 shows processing procedure for realizing the LED turn-on timing shown in the area B in the timing chart shown in FIG. 7. Note that each processing from Steps S801 to S807 corresponds to each processing from Steps S601 to S607 shown in FIG. 6. Therefore, the description thereof will be omitted.

The CPU 301 calculates a center position $T_C$ of the LED turn-on available period (S808). The center position $T_C$ of the turn-on period within the line cycle can be obtained by the expression (4).

Center position $T_C$ of turn-on available period=turn-on start position+turn-on available period/2  (4)

The CPU 301 sets the center position $T_C$ obtained in the processing of Step S808 as a reference position and changes the turn-on start timing and the turn-on end timing of each LED turn-on control signal (S809). The turn-on start position and the turn-on end position can be obtained by the expressions (5) and (6).

Turn-on start position=(4)−(turn-on start position−turn-on end position)/2  (5)

Turn-on end position=(4)+(turn-on start position−turn-on end position)/2  (6)

Setting the result obtained by the above calculation to the timing generation circuit 304, a timing to output the LED turn-on control signal is obtained. This is the timing shown in the area B shown in the timing chart in FIG. 7. As shown in the area B, the $T_C$ is defined by the start of the line cycle to the center position of the turn-on period of all LED turn-on control signals. As a result, the center position cycle of the turn-on period of each of the R, G, and B LEDs coincides with the line cycle $T_{SP}$.

As mentioned, the image reading apparatus 100 of the present embodiment sets the center position $T_C$ of the LED turn-on available period as a reference position. Then, turn-on start and turn-on end are controlled such that the center position of the turn-on period of each LED turn-on control signal coincides with the reference position. In the image reading apparatus 100, in which the LED turn-on period is adjusted for document illumination, color misregistration amount in the sub scanning direction of the read image of document becomes constant regardless of the turn-on period of the LED turn-on control signal. Also, in the image reading apparatus 100, the center position cycle of the turn-on period of the LED turn-on control signal coincides with the line cycle. Therefore, the color misregistration amount is reduced to almost one-third of the amount in the prior art, which eliminates the need to measure the color misregistration amount in the sub scanning direction for every image reading apparatus to correct the color misregistration in the sub scanning direction. Further, with one third color misregistration correction amount as previously determined, sufficient removal of the color misregistration becomes possible.

Note that, in the present embodiment, an example is given in a case where the center position $T_C$ of the LED turn-on available period is set as a reference position, however, the reference position may vary. For example, the reference position may be changed for every line cycle of each R, G, and B colors. In this case, an interval of the center position of the turn-on period does not coincide with the line cycle so that the color misregistration amount is not reduced to one third. However, the color misregistration amount does not differ from apparatus to apparatus but becomes almost constant for every apparatus, which allows to obtain similar effect.

Third Embodiment

Figure 9:
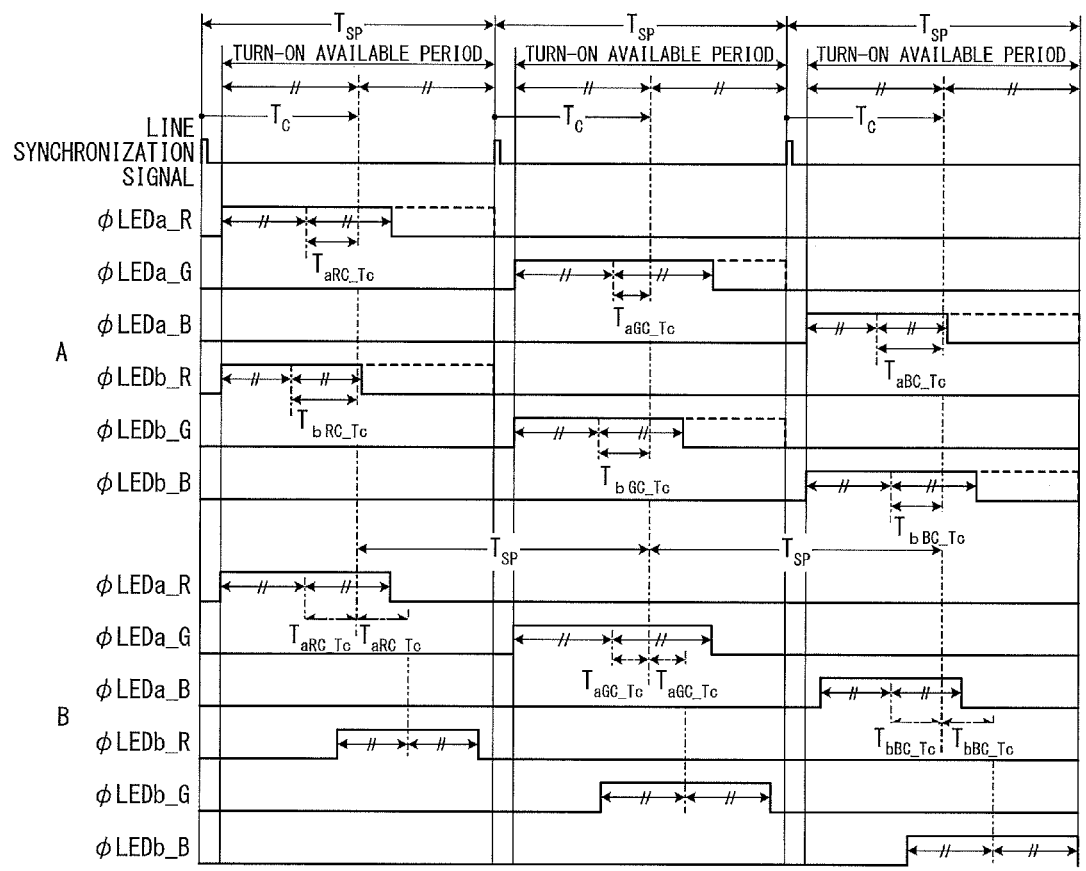
FIG. 9 is a timing chart of line synchronization signal and LED turn-on control signal in the image reading apparatus according to a third embodiment.
Figure 10:
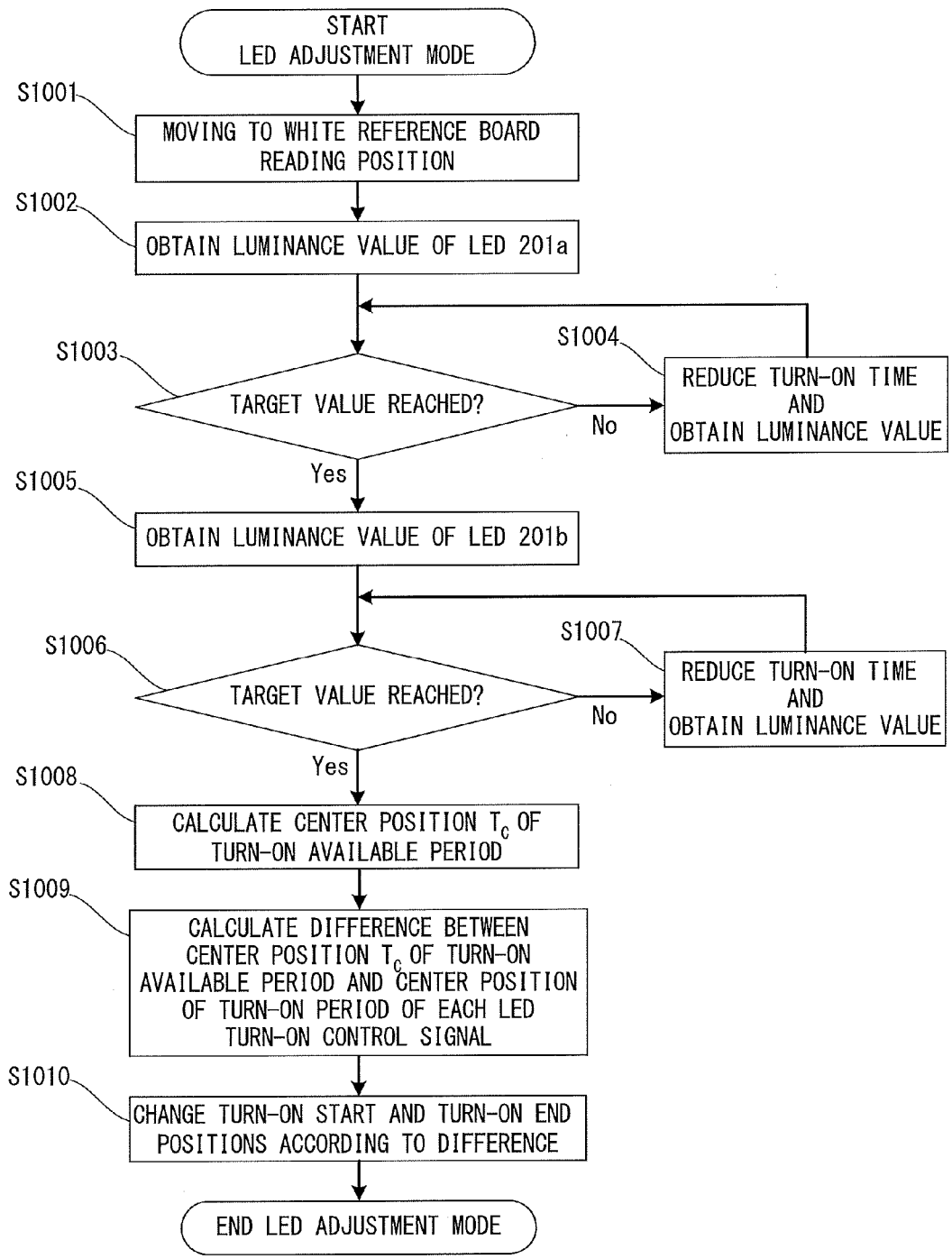
FIG. 10 is a flowchart illustrating an example of processing procedure in LED adjustment mode.

In the present embodiment, with the use of FIGS. 9 and 10, an image reading apparatus for performing processing which differs from the first embodiment and the second embodiment in the LED adjustment mode is described. Specifically, in the image reading apparatus of the present description, a reference position is defined as a center position of the turn-on available period. Further, the intermediate position between the center positions of the two LEDs having the same color coincides with the reference position. Description will be given for the red LED. In FIG. 9, area B shows control signal φLEDa_Rs in the first and the fourth stages. The intermediate position between the center positions of the turn-on period of the control signal φLEDa_R in the first stage and the control signal φLEDa_R in the fourth stage coincides with the reference position. Similarly, the intermediate position between the center positions of the two LEDs having the same color coincides with the reference position. Note that the same symbols are used for the components which are identical to those as described in the first and the second embodiments and the description thereof will be omitted.

FIG. 9 is a timing chart of the line synchronization signal and the LED turn-on control signal in the image reading apparatus according to the present embodiment. Note that an area A in the timing chart shown in FIG. 9 is the same as the area A shown in FIG. 5. Also, in the area B in the timing chart shown in FIG. 9, the center position of the turn-on available period is set as a reference position. The intermediate position between the center positions of the two LEDs having the same color coincides with the reference position. FIG. 9 shows the timing when the turn-on start position and the turn-on end position of each LED turn-on control signal are changed in the above-mentioned manner. That is, an intermediate position of the turn-on periods of the same colors coincides with the line cycle $T_{SP}$.

FIG. 10 is a flowchart illustrating an example of processing procedure of the image reading apparatus in LED adjustment mode. In particular, FIG. 10 shows processing procedure for realizing LED turn-on timing shown in the area B in the timing chart shown in FIG. 9. Note that each processing from Steps S1001 to S1008 corresponds to each processing from Steps S801 to S808 shown in FIG. 8. Therefore, the description thereof will be omitted.

The CPU 301 calculates difference between the center position $T_C$ of the turn-on available period and the center position of the turn-on period of each LED turn-on control signal (S1009). The difference is defined as $T_{aRC\_Tc}$, $T_{bRC\_Tc}$, $T_{aGC\_Tc}$, $T_{bGC\_Tc}$, $T_{aBC\_Tc}$, and $T_{bBC\_Tc}$ shown in the area A in the timing chart shown in FIG. 9.

Based on the difference calculated in the processing of Step S1009, the CPU 301 changes the turn-on start position and the turn-on end position of the LED turn-on control signal (S1010). In particular, the CPU 301 compares magnitudes of the difference between the same colors. Then, the turn-on start position and the turn-on end position are changed according to the comparison result by the expressions as below.

When $T_{aXC\_Tc} < T_{bXC\_Tc}$ (X:R, G or B):

φLEDa_X TURN-ON start position=$T_C - T_{aXC\_Tc}$ −(TURN-ON start position−TURN-ON end position)/2  (7)

φLEDa_X TURN-ON end position=$T_C - T_{aXC\_Tc}$ +(TURN-ON start position−TURN-ON end position)/2  (8)

φLEDb_X TURN-ON start position=$T_C + T_{aXC\_Tc}$ −(TURN-ON start position−TURN-ON end position)/2  (9)

φLEDb_X TURN-ON end position=$T_C + T_{aXC\_Tc}$ +(TURN-ON start position−TURN-ON end position)/2  (10)

When $T_{aXC\_Tc} > T_{bXC\_Tc}$ (X:R, G, or B):

$\varphi$LED$a$_$X$ TURN-ON start position=$T_C$−$T_{bXC\_Tc}$−
(TURN-ON start position-TURN-ON end position)/2  (11)

$\varphi$LED$a$_$X$ TURN-ON end position=$T_C$−$T_{bXC\_Tc}$+
(TURN-ON start position-TURN-ON end position)/2  (12)

$\varphi$LED$b$_$X$ TURN-ON start position=$T_C$+$T_{bXC\_Tc}$+
(TURN-ON start position-TURN-ON end position)/2  (13)

$\varphi$LED$b$_$X$ TURN-ON end position=$T_C$+$T_{bXC\_Tc}$+
(TURN-ON start position-TURN-ON end position)/2  (14)

Setting the result obtained by the above calculation to the timing generation circuit 304, a timing to output the LED turn-on control signal is obtained. This is the timing shown in the area B shown in the timing chart in FIG. 9. As shown in the area B, the LED turn-on period is defined as a period in which the center position of each LED turn-on period is shifted by an equal amount in a lateral direction with respect to the center position $T_C$ of the turn-on available period.

As mentioned, the image reading apparatus according to the present embodiment sets the center position $T_C$ of the turn-on available period as a reference position. The center position of the turn-on period of the LED turn-on control signal is shifted by a predetermined amount for every color. Thereby the intermediate position of the center position of the turn-on period of each color coincides with the reference position. In the image reading apparatus 100, in which LED turn-on period is adjusted for document illumination in the above-mentioned manner, the color misregistration amount in the sub scanning direction of the read image of the document becomes constant regardless of the turn-on period of the LED turn-on control signal. Also, in the image reading apparatus, the center position cycle of the turn-on period of the LED turn-on control signal coincides with the line cycle. Therefore, the color misregistration amount is reduced to almost one third, which eliminates the need to measure the color misregistration amount in the sub scanning direction for every image reading apparatus to correct the color misregistration in the sub scanning direction. Further, with one third color misregistration correction amount as previously determined, sufficient removal of the color misregistration becomes possible. Further, the increased LED turn-on period within the line cycle entails to reduce turn-off periods. Thereby document reading accuracy is improved.

As mentioned, according to the present disclosure, when reading document using light sources which turn on in a plurality of colors, color misregistration amount in the sub scanning direction can be made almost constant regardless of the turn-on period of each color which is turned on by the light source. Also, in the image reading apparatus of each embodiment as mentioned, when reading document, it is controlled such that the same color is turned on by the light source of the first illumination unit and the light source of the second illumination unit in the line cycle defined in response to the line synchronization signal. Further, it is controlled such that a center position of the turn-on period of each of the plurality of the light sources in the first illumination unit within the line cycle defined in response to the line synchronization signal coincides with a center position of the turn-on period of each of the plurality of the light sources in the second illumination unit within the line cycle defined in response to the line synchronization signal.

The present invention has been described in detail by way of the above-mentioned embodiments, but the scope of the present invention is not limited to those embodiments.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-035637, filed Feb. 26, 2014, and which is hereby incorporated by reference wherein in its entirety.

What is claimed is:

1. An image reading apparatus, comprising:
a first illumination unit and a second illumination unit each having a plurality of light sources, each illumination unit is configured to irradiate light from the light source to a document reading position, the plurality of light source include a first light source and a second light source, the first light source emits light in a first color and the second light source emits light in a second color which is different from the first color;
a light receiving unit configured to receive reflection light from a document to which light is irradiated by the first illumination unit and the second illumination unit, and to output, in response to a line synchronization signal, a first image signal in accordance with received light quantity; and
a control unit configured to independently control 1) a turn-on period of each of the plurality of light sources in the first illumination unit and 2) a turn-on period of each of the plurality of light sources in the second illumination unit, in response to the line synchronization signal, wherein:
the control unit is further configured to control, when reading the document, to turn on the light source of a same color by the first illumination unit and the second illumination unit within a line cycle defined in response to the line synchronization signal, and;
the control unit is further configured to control the first illumination unit and the second illumination unit such that a center position of the turn-on period of each of the plurality of the light sources in the first illumination unit coincides with a center position of the turn-on period of each of the plurality of the light sources in the second illumination unit, within the line cycle defined in response to the line synchronization signal.

2. An image reading apparatus according to claim 1, further comprising a reference member and an adjustment unit,
wherein the light receiving unit is further configured to receive reflection light from the reference member to which light is irradiated by the first illumination unit and outputs a second image signal and to receive reflection light from the reference member to which light is irradiated by the second illumination unit and outputs a third image signal;
wherein the adjustment unit is further configured to:
determine, in response to the second image signal, a turn-on time of each of the plurality of colors in the first illumination unit;
determine, in response to the third image signal, a turn-on time of each of the plurality of colors in the second illumination unit; and
adjust, based on the turn-on time of each of the plurality of light sources in the first illumination unit and the turn-on time of each of the plurality of light sources in the second illumination unit, the turn-on period of each of the plurality of light sources in the first illumination unit and the turn-on period of each of the plurality of light sources in the second illumination unit.

3. An image reading apparatus comprising:

an illumination unit having a light source which turns on with each of R, G, and B colors, and configured to irradiate light from the light source to a document;

a light receiving unit configured to receive diffused light from the document to which light is irradiated by the illumination unit for every line cycle, which is a cycle for reading one line data in a sub scanning direction of the document, and to output image signal in accordance with the received light quantity; and a control unit configured to independently control turn-on start and turn-on end of the light source for each color, wherein the control unit is configured to control to turn on the light source such that a color corresponding to each line cycle is turned on in order within three continuous line cycles, wherein the light source is turned on for a period set for each color, and wherein the control unit further configured to control the turn-on start and the turn-on end of the light source such that a center position of the turn-on period of each color coincides with a predetermined position within each of the line cycles.

4. An image reading apparatus according to claim 3, wherein the predetermined position is a center position of the turn-on period having the longest turn-on period among the turn-on periods.

5. An image reading apparatus according to claim 4, further comprising a luminance value calculation unit configured to calculate a luminance value based on the image signal which is outputted by the light receiving unit, wherein the turn-on period having the longest turn-on period among the turn-on periods is identified by:

(1) reducing turn-on periods of each of the R, G, B colors until luminance value of each of the R, G, and B colors calculated by the luminance value calculation unit based on the output from the light receiving unit reaches a predetermined value; and (2) identifying, based on the result, the longest turn-on periods among the turn-on periods.

6. An image reading apparatus according to claim 3, wherein the predetermined position is a center position of a turn-on available period of the light source within the line cycle.

7. An image reading apparatus according to claim 6, wherein the predetermined position is a center position of a turn-on available period of each color corresponding to the line cycle within the line cycle of each of the R, G, B colors.

8. An image reading apparatus comprising:

a first illumination unit having a light source which turns on with each of R, G, and B colors and configured to irradiate light from the light source to a document;

a second illumination unit having a light source which turns on with each of R, G, and B colors and configured to irradiate light from the light source to a position where the first illumination unit irradiates;

a light receiving unit configured to receive diffused light from the document to which light is irradiated by the first illumination unit and the second illumination unit for every line cycle, which is a cycle for reading one line data in a sub scanning direction of the document, and to output image signal in accordance with the received light quantity; and a control unit configured to independently control turn-on start and turn-on end of the light source of each of the first illumination unit and the second illumination unit for each color, wherein the control unit is further configured to control to turn on the light source of each of the first illumination unit and the second illumination unit such that a color corresponding to each line cycle is turned on in order within three continuous line cycles, wherein the light source is turned on for a period set for each color of the first illumination unit and the second illumination unit, and wherein the control unit is further configured to control the turn-on start and the turn-on end of the light source such that an intermediate position of a center position of the turn-on period of the light source of the first illumination unit and a center position of the turn-on period of the light source of the second illumination unit coincides with a predetermined position within each line cycle.

9. An image reading apparatus according to claim 8, wherein the predetermined position is a center position of a turn-on available period of the light source within the line cycle.

* * * * *